June 21, 1960  ISAMU OTA  2,941,410
POWER TRANSMISSION MECHANISM
Filed May 16, 1958

INVENTOR.
ISAMU OTA
BY
AGENT.

United States Patent Office 2,941,410
Patented June 21, 1960

2,941,410
POWER TRANSMISSION MECHANISM

Isamu Ota, Suita City, Japan, assignor to Nippon Seal Co., Ltd., Oyodo-ku, Osaka, Japan Filed May 16, 1958, Ser. No. 735,788

Claims priority, application Japan Sept. 28, 1957

11 Claims. (Cl. 74—229)

The present invention relates to improvements in power transmissions comprising a belt and two or more pulleys, and more particularly to a drive comprising a belt and pulleys whose cooperating working surfaces consist of pile fabrics.

Many known power transmission belts are made of leather or of various types of rubber-impregnated fabrics with relatively smooth working surfaces. Consequently, wax or the like is required to prevent slippage when the load becomes heavy in relation to the power transmitting capacity of such belts.

An object of the present invention is to provide a power transmission mechanism consisting of a belt and pulleys whose working surfaces consist of pile fabrics and which may be utilized as a reversible transmission.

Another object of the present invention is to provide a noiseless power transmission mechanism.

A further object of the present invention is to provide a substantially slipless power transmission mechanism.

The above and certain other objects of the present invention are attained by the provision of a belt which consists of or comprises a pile fabric specially arranged and bonded to orient pile obliquely to the left and to the right with respect to a line perpendicular to the longitudinal axis of the belt alternately in successive zones of the belt, and the piled surface is used as a working surface of the belt. Pile fabrics are manufactured in accordance with any of the conventional processes or by electrically setting a plurality of piles on the base fabrics. Similar pile fabrics are rigidly bonded, by utilizing suitable bonding agents, to the entire periphery or mantle of the pulleys over which the novel belt is led.

Thus, the belt and the pulleys have working surfaces comprising pile which is obliquely oriented in two different directions in predetermined zones of the working surface of the belt and in one or two directions and the working surfaces of the pulleys.

Owing to such arrangement, the obliquely oriented pile in the contact regions of the belt and of the pulleys may be aligned in the same direction or arranged in parallellism with each other; for example, the rightward oriented piles of the pulleys may be aligned with the rightward oriented piles of the belt while the leftward oriented piles of the pulleys will be alinged with the left-ward oriented piles of the belt.

If the driving pulley is rotated counter-clockwise by means of a motor, the leftward oriented pile on its working surface may interlock with the corresponding leftward oriented pile on the working surface of the belt to advance the belt to the left, and during the counter-clockwise rotation of the driving pulley its rightward oriented piles have a tendency to lay down to right and do not influence the advance of the belt. The arrangement of piles on the follower pulley and the belt may be of similar nature.

The movement of the belt can be easily reversed by reversing the direction in which the driving pulley rotates and, consequently, the follower pulley, too, will turn in opposing direction.

The invention will be described in greater detail with reference to the accompanying drawing in which.

Figure 1:
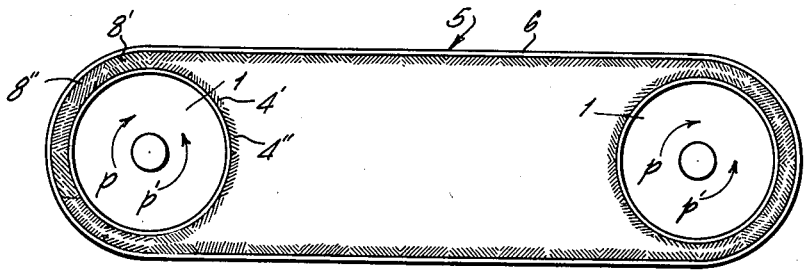
Fig. 1 is a side elevational view of one embodiment of the improved transmission in form of a belt conveyor.
Figure 2:
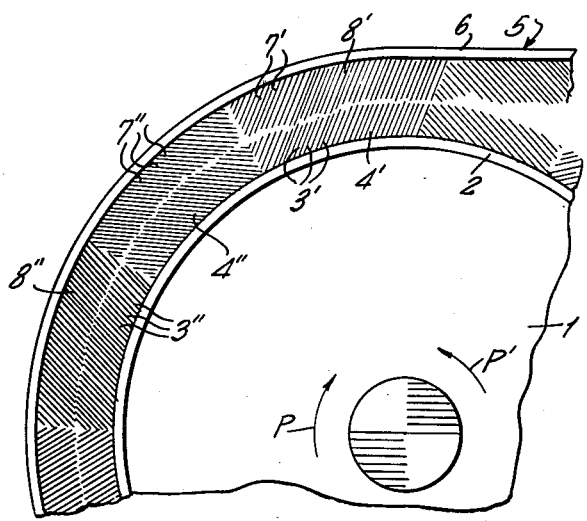
Fig. 2 is an enlarged fragmentary view of contacting regions of the working surfaces on a pulley and the belt constituting two component parts of the transmission shown in Fig. 1, the piles in adjacent regions of both contact surfaces being alternately inclined to the right and to the left, respectively.

Referring now in greater detail to Figs. 1 and 2, reference numerals 1 and 1' indicate a pair of spaced pulleys over which an endless, flexible belt 5 is entrained. The outer surfaces or mantles of the pulleys 1 and 1' are coated with layers of pile fabric, each layer having two types of pile zones 4' and 4". The pile 3' in zone 4' is inclined to the left and the pile 3" in zone 4" is inclined to the right with respect to the axis of rotation of the respective pulley. Thus, the pulleys are formed with novel working surfaces consisting of alternating zones 8' and 8", the zone 8' being provided with pile 7' oriented to the left and the zone 8" being provided with a pile 7" which is inclined to the right, respectively, with respect to a line perpendicular to the longitudinal axis of the belt. Owing to such arrangement, the pile on the inwardly turned working surface of the belt will interlock with the pile on the working surfaces of the pulleys. It is assumed in Fig. 1 that the tension is in the upper run of belt 5 during counter-clockwise rotation of pulleys 1 and 1' (arrows P'), and in the lower run of the belt when the pulleys 1 and 1' rotate clockwise (arrows P).

The pile fabrics to be used as working surfaces may be manufactured of synthetic, semi-synthetic, regenerated and natural fibers. It is preferred to use nylon of about 10–100 denier per filament and the length of pile extending from the adjacent surface of the fabric base may range from 0.5 to 7 mm. All zones of the oriented pile are of the same length and width.

When the pile consists of synthetic fibers, it may be readily inclined or oriented in predetermined directions and at desired angles with respect to the fabric base either in a dry process at temperatures of between about 110–130° C., or in a wet process at temperatures of about 100° C. It has been found that the preferred length and angle of inclination of the pile are between about 1 mm. and 4 mm., and between about 20° and 60°, respectively.

When the pulleys 1 and 1' and the belt are assembled as shown in Fig. 1, the working surfaces of the belt 5 and of pulleys 1 and 1' will be arranged as shown in Fig. 2 wherein the oriented piles 3' and 3" in the zones 4' and 4", respectively, of the pulley 1' will be aligned with the piles 7' and 7" in the zones 8' and 8", respectively, of the belt 5.

If the driving pulley 1 is turned in the counter-clockwise direction indicated by arrow P', as shown in Fig. 1, the leftward oriented pile 3' of the pulley 1 will interlock with the leftward oriented pile 7' of the belt 5 and will advance the belt 5 in a direction to the left. During such rotation the rightward oriented pile 4" of the pulley 1 will lay down to the right and, consequently, will exert no positive driving action on the belt, except for negligible frictional action.

When the belt 5 is advanced in the direction of arrows P', the rightward oriented pile 7" on its working surface is caused to interlock with the rightward oriented pile 4" on the working surface of the follower pulley 1' and the latter, too, will be turned in counter-clockwise direction indicated by arrow P'. In this manner, the driving pulley 1 transmits power to the follower pulley 1'.

If the driving pulley 1 is turned in the clockwise direction indicated by arrow P, the interlocking action of the pile will be exerted on the other zones of the belt and pulleys that is, the pile that previously had no positive action on the belt will act to advance the belt and the pile that had postive action will be inactive. The pile functions similarly on the working surfaces of the felt and of the follower pulley and, consequently, the latter, too, is turned in the direction of arrow P.

Thus, the present invention provides a power transmission mechanism of the reversible type.

The fabric layers render the novel power transmission mechanism practically noiseless. In addition, the transmission is substantially slipless due to the provision of fabric zones with oppositely inclined piles on the working surfaces of the belt and pulleys. Therefore, a given power may be transmitted with a narrower belt than in heretofore known transmissions.

When the belt is continuously advanced in only one direction, the working surfaces of pulleys may be formed with piles inclined in only one direction. For example, if the belt moves only in a direction to the left, the piles on the working surface of the driving pulley are oriented to the left and the piles on the working surface of the follower are oriented to the right so that they may interlock with corresponding piles on the working surface of the belt which latter are arranged in alternately inclined groups.

Figure 3:
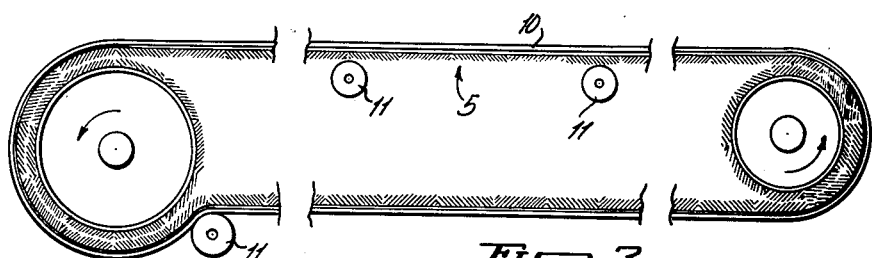
Fig. 3 is a side elevational view of a slightly modified belt conveyor.
Figure 4:
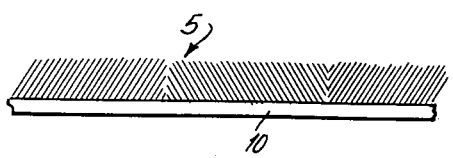
Fig. 4 is an enlarged fragmentary view of the belt constituting a component part of the belt conveyor shown in Fig. 3.

Referring now to Fig. 3, there is shown a belt conveyor wherein the belt 5 is covered by a layer 10 of fabric or the like to protect the outer side of the pile fabric from wear. A plurality of guide rollers 11 is disposed along the path of the belt to hold it as nearly flat as possible for smooth transfer of goods thereon.

The invention is, of course, not limited to the specific embodiments described and illustrated but may be realized in various modifications and adaptations without departing from the spirit and scope of the appended claims.

What I claim is:

1. A power transmission mechanism comprising, in combination: a flexible endless belt having a longitudinal axis and an inwardly turned working surface consisting of a fabric comprising alternately arranged first and second pile zones, each first zone having piles inclined to the left and each second zone having piles inclined to the right with respect to a line which is perpendicular to said axis; and at least two spaced pulleys, at least one of said pulleys constituting a driving pulley and each other pulley constituting a follower pulley, each pulley having a mantle over which the working surface of said belt is led and a working surface consisting of a fabric bonded to said mantle, each said last mentioned working surface consisting of at least one pile zone having piles inclined in one of the directions in which the piles on the working surface of said belt are inclined for interlocking with similarly inclined piles on the working surface of said belt and for advancing the latter when each driving pulley is rotated, each follower pulley being rotated by said belt.

2. A reversible power transmission mechanism comprising, in combination: a flexible endless belt having a longitudinal axis and an inwardly turned working surface consisting of a fabric comprising alternately arranged first and second pile zones, each first zone having piles inclined to the left and each second zone having piles inclined to the right with respect to a line which is perpendicular to said axis; and at least two spaced pulleys, at least one of said pulleys constituting a driving pulley and each other pulley constituting a follower pulley, each pulley having a mantle and a working surface consisting of a pile fabric bonded to said mantle over which the working surface of said belt is led, the working surface of each pulley comprising alternately arranged third and fourth pile zones, each third zone having piles inclined substantially in the direction in which the piles in said first zone are inclined and each fourth zone having piles inclined substantially in the direction in which the piles in said second zone are inclined, whereby the similarly inclined piles on the working surface of said belt and on the working surfaces of said pulleys interlock with each other and the piles of each driving pulley transmit power to said belt and over the latter rotate each follower pulley.

3. A power transmission mechanism as set forth in claim 2, wherein the fabric of which the working surface of said belt consists has an outer side, and further comprising a flexible fabric layer applied to said outer side.

4. A power transmission mechanish as set forth in claim 2, wherein said belt has an outer side, and further comprising at least one guide roller engaging with said outer side for flattening the path of said belt.

5. A power transmission mechanism as set forth in claim 2, wherein the working surfaces of said belt and of said pulleys are composed of a fabric material selected from the group consisting of synthetic, semi-synthetic, regenerated and natural fibers.

6. A power transmission mechanism as set forth in claim 5, wherein each said fabric has a base and the length of said piles is between about 0.5 mm. and 7 mm., the inclination of said piles with respect to the planes of respective bases being between about 20° and 60°.

7. A power transmission mechanism as set forth in claim 2, wherein the working surfaces of said belt and of said pulley are composed of a fabric material selected from the group consisting of synthetic, semi-synthetic and regenerated filaments of about 10–100 denier.

8. A power transmission mechanism as set forth in claim 7, wherein the piles are inclined by heat treatment at temperatures of between about 100° C. and 130° C.

9. As a novel article of manufacture for use in a belt conveyor, an endless flexible belt having a longitudinal axis and an inwardly turned working surface consisting of a pile fabric comprising alternately arranged first and second pile zones, each first zone having piles inclined to the left and each second zone having piles inclined to the right with respect to a line which is perpendicular to said axis.

10. As a novel article of manufacture for use in a belt conveyor, an endless flexible belt having a longitudinal axis and comprising an inwardly turned working surface consisting of a pile fabric comprising alternately arranged first and second pile zones, each first zone having piles inclined to the left and each second zone having piles inclined to the right with respect to a line which is perpendicular to said axis, said fabric having an outer side, and a flexible fabric layer applied to the outer side of said first mentioned fabric.

11. As a novel article of manufacture for use in a belt conveyor, a pulley having an axis of rotation, a mantle and a working surface consisting of a pile fabric bonded to said mantle, said fabric comprising alternately arranged first and second pile zones, each first zone having piles inclined to the left and each second zone having piles inclined to the right with respect to the axis of said pulley.

References Cited in the file of this patent

UNITED STATES PATENTS

| | | |
|---|---|---|
| 823,892 | Parkes | June 19, 1906 |

FOREIGN PATENTS

| | | |
|---|---|---|
| 10,566 | Great Britain | of 1911 |
| 202,110 | Canada | July 20, 1920 |
| 430,545 | Great Britain | June 20, 1935 |